US010647832B2

(12) United States Patent
Haley et al.

(10) Patent No.: US 10,647,832 B2
(45) Date of Patent: May 12, 2020

(54) POLYMER COMPOSITION FOR FORMING A MELT-EXTRUDED FILM AND COMPOSITES THEREOF

(71) Applicant: Celanese EVA Performance Polymers Corporation, Irving, TX (US)

(72) Inventors: Jeffrey Charles Haley, Norwood, OH (US); Robert Weber, Liberty Township, OH (US); Myra Sumague, Edmonton (CA); Dirk Hair, Edmonton (CA)

(73) Assignee: Celanese EVA Performance Polymers Corp., Irving, TX (US)

( * ) Notice: Subject to any disclaimer, the term of this patent is extended or adjusted under 35 U.S.C. 154(b) by 0 days.

(21) Appl. No.: 16/220,192

(22) Filed: Dec. 14, 2018

(65) Prior Publication Data

US 2019/0194419 A1      Jun. 27, 2019

Related U.S. Application Data

(63) Continuation of application No. 15/242,920, filed on Aug. 22, 2016, now Pat. No. 10,155,859.

(60) Provisional application No. 62/295,228, filed on Feb. 15, 2016, provisional application No. 62/209,943, filed on Aug. 26, 2015.

(51) Int. Cl.
| | |
|---|---|
| *C08K 5/098* | (2006.01) |
| *C08L 23/08* | (2006.01) |
| *C08J 3/20* | (2006.01) |
| *C08J 5/18* | (2006.01) |
| *C08J 3/22* | (2006.01) |
| *B32B 27/10* | (2006.01) |
| *B32B 37/15* | (2006.01) |
| *B32B 5/02* | (2006.01) |
| *B32B 29/00* | (2006.01) |
| *B32B 27/32* | (2006.01) |
| *B32B 27/18* | (2006.01) |
| *B32B 27/16* | (2006.01) |
| *B32B 27/12* | (2006.01) |
| *B32B 27/06* | (2006.01) |
| *B32B 27/08* | (2006.01) |
| *B32B 7/12* | (2006.01) |
| *B32B 5/18* | (2006.01) |
| *B32B 15/085* | (2006.01) |
| *B32B 27/36* | (2006.01) |
| *C08K 5/134* | (2006.01) |
| *C08K 5/00* | (2006.01) |

(52) U.S. Cl.
CPC ............... *C08K 5/098* (2013.01); *B32B 5/02* (2013.01); *B32B 5/18* (2013.01); *B32B 7/12* (2013.01); *B32B 15/085* (2013.01); *B32B 27/065* (2013.01); *B32B 27/08* (2013.01); *B32B 27/10* (2013.01); *B32B 27/12* (2013.01); *B32B 27/16* (2013.01); *B32B 27/18* (2013.01); *B32B 27/32* (2013.01); *B32B 27/36* (2013.01); *B32B 29/002* (2013.01); *B32B 37/153* (2013.01); *C08J 3/203* (2013.01); *C08J 3/226* (2013.01); *C08J 5/18* (2013.01); *C08K 5/005* (2013.01); *C08K 5/1345* (2013.01); *C08L 23/0853* (2013.01); *B32B 2274/00* (2013.01); *B32B 2307/30* (2013.01); *B32B 2553/00* (2013.01); *C08J 2323/08* (2013.01); *C08K 2201/014* (2013.01)

(58) Field of Classification Search
CPC ......... B32B 27/10; B32B 37/153; B32B 5/02; B32B 29/002; B32B 27/32; B32B 27/18; B32B 27/16; B32B 27/12; B32B 27/08; B32B 27/065; B32B 7/12; B32B 5/18; B32B 15/085; B32B 27/36; B32B 2274/00; B32B 2553/00
See application file for complete search history.

(56) References Cited

U.S. PATENT DOCUMENTS

| | | | |
|---|---|---|---|
| 2,425,389 | A | 8/1947 | Oxley et al. |
| 2,859,241 | A | 11/1958 | Schnizer |
| 3,470,122 | A | 9/1969 | Ridgeway et al. |
| 3,488,306 | A | 1/1970 | Thormahlen |
| 3,935,141 | A | 1/1976 | Potts et al. |
| 3,979,180 | A | 9/1976 | Lorand |
| 4,456,639 | A | 6/1984 | Drower et al. |
| 4,594,211 | A | 6/1986 | Mohnhaupt |
| 4,767,485 | A | 8/1988 | Michiels |

(Continued)

FOREIGN PATENT DOCUMENTS

| | | | |
|---|---|---|---|
| GB | 1 342 622 | | 1/1974 |
| JP | 4-45152 | * | 2/1992 |

(Continued)

OTHER PUBLICATIONS

Supplementary European Search Report for EP 16 83 9932 dated Feb. 8, 2019, 6 pages.

(Continued)

*Primary Examiner* — Robert D Harlan
(74) *Attorney, Agent, or Firm* — Dority & Manning, P.A.

(57) ABSTRACT

A polymer composition that can be used to form a melt-extruded film is provided. The polymer composition may contain an olefinic polymer and a transition metal salt. By selectively controlling specific aspects of the polymer and the transition metal salt, as well as the relative concentration of each component, the present inventors have discovered that the resulting composition can exhibit a relatively fast oxidation rate, which has been found to improve the adhesion of the composition to a wide variety of substrates.

20 Claims, 5 Drawing Sheets

(56) References Cited

U.S. PATENT DOCUMENTS

| | | | |
|---|---|---|---|
| 4,843,170 | A | 6/1989 | Isshiki et al. |
| 5,212,219 | A | 5/1993 | Griffin |
| 5,387,630 | A | 2/1995 | Edwards et al. |
| 5,470,526 | A | 11/1995 | Wilfong et al. |
| 5,492,953 | A | 2/1996 | Itamura et al. |
| 5,512,370 | A | 4/1996 | Edwards et al. |
| 5,854,304 | A | 12/1998 | Garcia et al. |
| 6,353,048 | B1 | 3/2002 | Onishi et al. |
| 6,639,001 | B1 | 10/2003 | Birnbrich et al. |
| 7,405,009 | B2 | 7/2008 | Ahmed et al. |
| 7,736,726 | B2 | 6/2010 | McAllister, Jr. et al. |
| 10,155,859 | B2 * | 12/2018 | Haley ................ B32B 37/153 |
| 2001/0003797 | A1 * | 6/2001 | Guevara .......... A61F 13/15252 |
| | | | 604/364 |

FOREIGN PATENT DOCUMENTS

| | | |
|---|---|---|
| JP | H 0445152 A | 2/1992 |
| JP | 2003105142 A | 4/2003 |
| KR | 20130067389 A | 6/2013 |
| WO | WO 92/12200 A1 | 7/1992 |

OTHER PUBLICATIONS

Article—Nguyen et al., "Thermal Oxidation of Polyolefins by Mild Pro-Oxidant Additives Based on Iron Carboxylates and Lipophilic Amines: Degradability in the Absence of Light and Effect on the Adhesion to Paperboard," *Polymers*, vol. 7, 2015, pp. 1522-1540.
International Search Report and Written Opinion for PCT/US2016/047994 dated Nov. 3, 2016, 10 pages.

* cited by examiner

FIG. 8

POLYMER COMPOSITION FOR FORMING A MELT-EXTRUDED FILM AND COMPOSITES THEREOF

RELATED APPLICATIONS

The present application is a continuation of U.S. application Ser. No. 15/242,920 having a filing date of Aug. 22, 2016, which claims priority to U.S. Provisional Application Ser. Nos. 62/209,943, filed on Aug. 26, 2015, and 62/295,228, filed on Feb. 15, 2016, which are incorporated herein in their entirety by reference thereto.

BACKGROUND OF THE INVENTION

Extrusion coating is a process commonly used to produce composites for use in a wide variety of applications, such as food or medical packaging, document protection, and so forth. Thermal lamination sleeves, for instance, have been formed by melt-extruding a film of an ethylene vinyl acetate copolymer onto a polyester film substrate. One parameter that can have a tremendous impact on the quality of the resulting composite is the ability of the melt-extruded film to adequately adhere to the substrate. For this reason, a variety of techniques have been employed to help improve adhesion. One such technique is to partially oxidize the coating by controlling certain process parameters, including increasing processing temperatures, extending the distance between the die and the substrate (thus increasing the amount of time the hot curtain is in contact with air), or slowing down the line. While these tools may be of some benefit, they all have practical limits. For example, ethylene vinyl acetate copolymers can decompose at high temperatures, which may limit the extent to which processing temperatures can be increased. Increasing the distance between the die gap may likewise lead to an increased transverse direction necking, which limits the width of film that can be coated and increases material waste.

As such, a need currently exists for an improved technique of extrusion coating a film onto a substrate, as well as improved compositions for such processes.

SUMMARY OF THE INVENTION

In accordance with one embodiment of the present invention, a polymer composition is disclosed that comprises at least one olefinic polymer in an amount of at least about 50 wt. % of the polymer composition and at least one transition metal salt in an amount of from about 10 to about 1,000 parts per million based on the weight of olefinic polymers in the composition. The polymer composition exhibits a heat flow of about 0.7 watts per gram or more after being exposed to an oxygen atmosphere at a temperature of 180° C. for a time period of about 100 minutes or less.

In accordance with another embodiment of the present invention, a composite is disclosed that comprises a substrate and a melt-extruded film that is positioned adjacent to the substrate and contains a polymer composition. The polymer composition comprises at least one olefinic polymer in an amount of at least about 50 wt. % of the polymer composition and at least one transition metal salt in an amount of from about 10 to about 1,000 parts per million based on the weight of olefinic polymers in the composition.

In accordance with yet another embodiment of the present invention, a polymer composition is disclosed that comprises at least one olefinic polymer in an amount of at least about 50 wt. % of the polymer composition. The polymer composition exhibits a heat flow of 0.15 W/g after being exposed to an oxygen atmosphere at a temperature of 180° C. for a time period of about 1.5 minutes or less.

Other features and aspects of the present invention are set forth in greater detail below.

BRIEF DESCRIPTION OF THE FIGURES

The present invention may be better understood with reference to the following figures.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that can be used to form a melt-extruded film for use in a wide variety of applications. Namely, the polymer composition may contain an olefinic polymer and a transition metal salt. By selectively controlling specific aspects of the polymer and the transition metal salt, as well as the relative concentration of each component, the present inventors have discovered that the resulting composition can exhibit a relatively fast oxidation rate.

The oxidation rate of the composition can be characterized by the heat flow profile of the composition while being exposed to oxygen using differential scanning calorimetry ("DSC") in accordance with ASTM D3895-14. More particularly, the fast oxidizing polymer composition of the present invention may exhibit a heat flow of about 0.7 watts per gram ("W/g") or more, in some embodiments about 0.8 W/g or more, and in some embodiments, from about 0.85 to about 1.5 W/g after being exposed to an oxygen atmosphere at a temperature of 180° C. The onset of heat flow can be achieved within a time period of about 100 minutes or less, in some embodiments about 60 minutes or less, in some embodiments about 20 minutes or less, in some embodiments about 2 minutes or less, in some embodiments about 1 minute or less, and in some embodiments, from about 1 second to about 50 seconds. In certain embodiments, for instance, the composition may exhibit a heat flow of 0.15 W/g after being exposed to an oxygen atmosphere at a temperature of 180° C. for about 1.5 minutes or less, in some embodiments about 1 minute or less, and in some embodiments, from 1 second to about 50 seconds. The increased oxidation rate of the polymer composition has been found to improve the adhesion of the composition to a wide variety of substrates. For example, the peel strength between the polymer composition and substrate (e.g., polyester film) may be about 30 g/in or more, in some embodiments about 50 g/in or more, in some embodiments about 75 g/in or more, in some embodiments from about 80 to about 800 g/in, and in some embodiments, from about 100 to about 600 g/in, as determined using a 90° T-peel test in accordance with ASTM D1876-08 (2015).

Various embodiments of the present invention will now be described in further detail.

I. Polymer Composition

As noted above, the polymer composition of the present invention may contain at least one olefinic polymer and at least one transition metal salt. The amount of the transition metal salts is typically controlled so that the polymer composition can achieve the desired degree of oxidation, but not so high so as to adversely impact the properties and processability of the resulting composition. For instance, transition metal salts typically constitute from about 10 to about 1,000 parts per million, in some embodiments from about 20 to about 500 parts per million, and in some embodiments, from about 30 to about 200 parts per million, based on the weight of olefinic polymers in the composition. In certain embodiments, transition metal salts may constitute from about 10 to about 1,000 parts per million, in some embodiments from about 20 to about 500 parts per million, and in some embodiments, from about 30 to about 200 parts per million of the entire polymer composition. Likewise, olefinic polymers typically constitute at least about 50 wt. %, in some embodiments from about 60 wt. % to about 99.999 wt. %, in some embodiments from about 80 wt. % to about 99.5 wt. %, and in some embodiments, from about 90 wt. % to about 99.5 wt. % of the polymer composition. Regardless of the relative concentration of each component, the melt flow index of the resulting composition typically ranges range from about 0.5 to about 50 grams per 10 minutes ("g/10 min"), in some embodiments from about 1 to about 40 g/10 min, in some embodiments from about 5 to about 30 g/10 min, and in some embodiments, from about 12 to about 25 g/10 min, as determined in accordance with ASTM D1238-13 at a temperature of 190° C. and a load of 2.16 kilograms. The melting point may also range from about 60° C. to about 120° C., and in some embodiments, from about 65° C. to about 115° C., as determined in accordance with ASTM D3418-12e1.

A. Olefinic Polymer

A wide variety of olefin polymers may generally be employed in the polymer composition, such as ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, olefin-diene copolymers, ethylene vinyl acetate copolymers, ethylene (meth)acrylic acid polymers (e.g., ethylene acrylic acid copolymers and partially neutralized ionomers of these copolymers, ethylene methacrylic acid copolymers and partially neutralized ionomers of these copolymers, etc.), ethylene (meth)acrylate polymers (e.g., ethylene methylacrylate copolymers, ethylene ethyl acrylate copolymers, ethylene butyl acrylate copolymers, etc.), and so forth. In one particular embodiment, for example, the polymer composition may contain an ethylene vinyl acetate polymer, which is defined as a copolymer that contains at least one ethylene monomer and at least one vinyl acetate monomer. When employed, the present inventors have discovered that certain aspects of the ethylene vinyl acetate polymer can also be selectively controlled to help achieve the desired oxidative properties. For instance, the ethylene vinyl acetate polymer may be selectively controlled so that it has a vinyl acetate content of from about 5 wt. % to about 35 wt. %, in some embodiments about 10 wt. % to about 30 wt. %, and in some embodiments, from about 12 wt. % to about 25 wt. %. The density of the ethylene vinyl acetate polymer may also range from about 0.900 to about 1.00 gram per cubic centimeter (g/cm$^3$), in some embodiments from about 0.910 to about 0.980 g/cm$^3$, and in some embodiments, from about 0.930 to about 0.960 g/cm$^3$, as determined in accordance with ASTM D1505-10. Still further, the melt flow index of the ethylene vinyl acetate polymer may range from about 0.1 to about 70 g/10 min, in some embodiments from about 0.5 to about 50 g/10 min, and in some embodiments, from about 1 to about 35 g/10 min, as determined in accordance with ASTM D1238-13 at a temperature of 190° C. and a load of 2.16 kilograms. The melting point may also range from about 60° C. to about 120° C., and in some embodiments, from about 75° C. to about 100° C., as determined in accordance with ASTM D3418-12e1. Examples of suitable ethylene vinyl acetate polymers that may be employed include those available from Celanese under the designation ATEVA® (e.g., ATEVA® 1609, 1813, or 2821A); DuPont under the designation ELVAX® (e.g., ELVAX® 470); and Arkema under the designation EVATANE® (e.g., EVATANE 20-20).

Any of a variety of techniques may generally be used to form the ethylene vinyl acetate polymer with the desired properties as is known in the art. In one embodiment, the polymer is produced by copolymerizing an ethylene monomer and a vinyl acetate monomer in a high pressure reaction. Vinyl acetate may be produced from the oxidation of butane to yield acetic anhydride and acetaldehyde, which can react together to form ethylidene diacetate. Ethylidene diacetate can then be thermally decomposed in the presence of an acid catalyst to form the vinyl acetate monomer. Examples of suitable acid catalysts include aromatic sulfonic acids (e.g., benzene sulfonic acid, toluene sulfonic acid, ethylbenzene sulfonic acid, xylene sulfonic acid, and naphthalene sulfonic acid), sulfuric acid, and alkanesulfonic acids, such as described in U.S. Pat. No. 2,425,389 to Oxley et al.; U.S. Pat. No. 2,859,241 to Schnizer; and U.S. Pat. No. 4,843,170 to Isshiki et al. The vinyl acetate monomer can also be produced by reacting acetic anhydride with hydrogen in the presence of a catalyst instead of acetaldehyde. This process converts vinyl acetate directly from acetic anhydride and hydrogen without the need to produce ethylidene diacetate. In yet another embodiment, the vinyl acetate monomer can be produced from the reaction of acetaldehyde and a ketene in the presence of a suitable solid catalyst, such as a perfluorosulfonic acid resin or zeolite.

B. Transition Metal Salt

As indicated above, the polymer composition of the present invention may also contain a transition metal salt. Without intending to be limited by theory, it is believed that the transition metal atom in the salt can accelerate free radical generation by hydroperoxides, which may be introduced along the polymer backbone during exposure to an oxidizing atmosphere (e.g., oxygen, air, etc.) at an elevated temperature, such as above about 150° C. (e.g., 180° C.). The transition metal cation employed in the salt may vary, but is typically a multi-valent transition metal (e.g., divalent or trivalent). Examples of such multi-valent transition metals may include, for instance, iron, manganese, nickel, copper, cobalt, vanadium, chromium, etc., as well as mixtures thereof. Iron may be particularly suitable. The anion of the salt may vary, such as a carboxylate, sulfonate, etc. In one embodiment, for instance, the anion is a carboxylate that is derived from a fatty acid. The fatty acid may generally be any saturated or unsaturated acid having a carbon chain length of from about 8 to 22 carbon atoms, and in some embodiments, from about 10 to about 18 carbon atoms. If desired, the acid may be substituted. Suitable fatty acids may include, for instance, lauric acid, myristic acid, behenic acid, oleic acid, palmitic acid, stearic acid, ricinoleic acid, capric acid, neodecanoic acid, hydrogenated tallow fatty acid, hydroxy stearic acid, the fatty acids of hydrogenated castor oil, erucic acid, coconut oil fatty acid, etc., as well as mixtures thereof. For instance, exemplary salts may include iron stearate, manganese stearate, nickel stearate, cobalt stearate, etc., as well as combinations thereof.

C. Optional Additives

To maintain the desired properties, a substantial portion of the composition can sometimes be formed from olefin polymers and transition metal salts. That is, about 50 wt. % or more, in some embodiments from about 60 wt. % to about 99 wt. %, and in some embodiments, from about 70 wt. % to about 95 wt. % of the composition is formed by such components. Nevertheless, the composition may optionally contain one or more additives if so desired, such as flow aids, antimicrobials, fillers pigments, antioxidants, stabilizers, surfactants, waxes, solid solvents, flame retardants, anti-drip additives, and other materials added to enhance properties and processability. When employed, the optional additive(s) typically constitute from about 0.001 wt. % to about 50 wt. %, and in some embodiments, from about 0.01 wt. % to about 40 wt. %, and in some embodiments, from about 0.02 wt. % to about 30 wt. % of the composition.

In certain embodiments, for example, an antioxidant may be employed to help stabilize the melt flow properties of the composition. More particularly, the present inventors have discovered that reactions can sometimes occur between the olefinic polymer and transition metal, which results in an undesirable change in the melt flow index of the composition. The use of antioxidants can help to ameliorate this effect. For instance, sterically hindered phenolic antioxidant(s) may be employed in certain embodiments for this purpose. Examples of such phenolic antioxidants include, for instance, calcium bis(ethyl 3,5-di-tert-butyl-4-hydroxybenzylphosphonate) (Irganox® 1425); terephthalic acid, 1,4-dithio-,S,S-bis(4-tert-butyl-3-hydroxy-2,6-dimethylbenzyl) ester (Cyanox® 1729); triethylene glycol bis(3-tert-butyl-4-hydroxy-5-methylhydrocinnamate); hexamethylene bis(3,5-di-tert-butyl-4-hydroxyhydrocinnamate (Irganox® 259); 1,2-bis(3,5,di-tert-butyl-4-hydroxyhydrocinnamoyl)hydrazide (Irganox® 1024); 4,4'-di-tert-octyldiphenamine (Naugalube® 438R); phosphonic acid, (3,5-di-tert-butyl-4-hydroxybenzyl)-dioctadecyl ester (Irganox® 1093); 1,3,5-trimethyl-2,4,6-tris(3',5'-di-tert-butyl-4'hydroxybenzyl)benzene (Irganox® 1330); 2,4-bis(octylthio)-6-(4-hydroxy-3,5-di-tert-butylanilino)-1,3,5-triazine (Irganox® 565); isooctyl 3-(3,5-di-tert-butyl-4-hydroxyphenyl)propionate (Irganox® 1135); octadecyl 3-(3,5-di-tert-butyl-4-hydroxyphenyl)propionate (Irganox® 1076); 3,7-bis(1,1,3,3-tetramethylbutyl)-10H-phenothiazine (Irganox® LO 3); 2,2'-methylenebis(4-methyl-6-tert-butylphenol)monoacrylate (Irganox® 3052); 2-tert-butyl-6-[1-(3-tert-butyl-2-hydroxy-5-methylphenyl)ethyl]-4-methylphenyl acrylate (Sumilizer® TM 4039); 2-[1-(2-hydroxy-3,5-di-tert-pentylphenyl)ethyl]-4,6-di-tert-pentylphenyl acrylate (Sumilizer® GS); 1,3-dihydro-2H-Benzimidazole (Sumilizer® MB); 2-methyl-4,6-bis[(octylthio)methyl]phenol (Irganox® 1520); N,N'-trimethylenebis-[3-(3,5-di-tert-butyl-4-hydroxyphenyl)propionamide (Irganox® 1019); 4-n-octadecyloxy-2,6-diphenylphenol (Irganox® 1063); 2,2'-ethylidenebis[4,6-di-tert-butylphenol] (Irganox® 129); N N'-hexamethylenebis(3,5-di-tert-butyl-4-hydroxyhydrocinnamide) (Irganox® 1098); diethyl (3,5-di-tert-butyl-4-hydroxybenxyl)phosphonate (Irganox® 1222); 4,4'-di-tert-octyldiphenylamine (Irganox® 5057); N-phenyl-1-napthalenamine (Irganox® L 05); tris[2-tert-butyl-4-(3-ter-butyl-4-hydroxy-6-methylphenylthio)-5-methyl phenyl] phosphite (Hostanox® OSP 1); zinc dinonyidithiocarbamate (Hostanox® VP-ZNCS 1); 3,9-bis[1,1-diimethyl-2-[(3-tert-butyl-4-hydroxy-5-methylphenyl)propionyloxy]ethyl]-2,4, 8,10-tetraoxaspiro[5.5]undecane (Sumilizer® AG80); tetrakis [methylene-(3,5-di-tertbutyl-4-hydroxycinnimate)] methane (Irganox® 1010); and ethylene-bis(oxyethylene) bis[3-(5-tert-butyl-4-hydroxy-m-tolyl)-propionate (Irganox® 245); and so forth.

The amount of the antioxidants can be selectively controlled to help achieve the desired improvement in flow properties without having an adverse impact on other properties of the composition, such as its ability to adhere to a substrate. In this regard, when employed, antioxidants typically constitute from about 10 to about 500 parts per million of the composition, in some embodiments from about 50 to about 450 parts per million of the composition, and in some embodiments, from about 100 to about 400 parts per million of the composition.

II. Melt Blending

Generally speaking, the olefin polymer, transition metal salt, and other optional additives may be melt blended together to form the polymer composition. Melt blending may occur at a temperature range of from about 60° C. to about 260° C., in some embodiments, from about 80° C. to about 250° C., and in some embodiments, from about 100° C. to about 220° C. to form the polymer composition. Any of a variety of melt blending techniques may generally be employed in the present invention. For example, the components may be supplied separately or in combination to an extruder that includes at least one screw rotatably mounted and received within a barrel (e.g., cylindrical barrel). The extruder may be a single screw or twin screw extruder. For example, one embodiment of a single screw extruder may contain a housing or barrel and a screw rotatably driven on one end by a suitable drive (typically including a motor and gearbox). If desired, a twin-screw extruder may be employed that contains two separate screws. The configuration of the screw is not particularly critical to the present invention and it may contain any number and/or orientation of threads and channels as is known in the art. For example, the screw typically contains a thread that forms a generally helical channel radially extending around a core of the screw. A feed section and melt section may be defined along the length of the screw. The feed section is the input portion of the barrel where the ethylene vinyl acetate polymer and/or transition metal salt are added. The melt section is the phase change section in which the polymer is changed from a solid to a liquid. While there is no precisely defined delineation of these sections when the extruder is manufactured, it is well within the ordinary skill of those in this art to reliably identify the feed section and the melt section in which phase change from solid to liquid is occurring. Although not necessarily required, the extruder may also have a mixing section that is located adjacent to the output end of the barrel and downstream from the melting section. If desired, one or more distributive and/or dispersive mixing elements may be employed within the mixing and/or melting sections of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

If desired, the ratio of the length ("L") to diameter ("D") of the screw may be selected to achieve an optimum balance between throughput and blending of the components. The L/D value may, for instance, range from about 15 to about 50, in some embodiments from about 20 to about 45, and in some embodiments from about 25 to about 40. The length of the screw may, for instance, range from about 0.1 to about 5 meters, in some embodiments from about 0.4 to about 4 meters, and in some embodiments, from about 0.5 to about 2 meters. The diameter of the screw may likewise be from about 5 to about 150 millimeters, in some embodiments from about 10 to about 120 millimeters, and in some embodiments, from about 20 to about 80 millimeters. In addition to the length and diameter, other aspects of the extruder may also be selected to help achieve the desired degree of blending. For example, the speed of the screw may be selected to achieve the desired residence time, shear rate, melt processing temperature, etc. For example, the screw speed may range from about 10 to about 800 revolutions per minute ("rpm"), in some embodiments from about 20 to about 500 rpm, and in some embodiments, from about 30 to about 400 rpm. The apparent shear rate during melt blending may also range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4 Q/\pi R^3$, where Q is the volumetric flow rate ("m$^3$/s") of the polymer melt and R is the radius ("m") of the capillary (e.g., extruder die) through which the melted polymer flows.

III. Films and Composites

Regardless of its particular constituents, any of variety of different techniques may generally be used to form the composition into a film. Suitable film-forming techniques may include, for instance, extrusion casting, flat sheet die extrusion, blown film extrusion, tubular trapped bubble film processes, etc. The film may generally have a thickness of from about 0.1 micrometers to about 25 millimeters. Thin films may, for instance, have a thickness of from about 0.1 micrometers to about 0.5 millimeters, in some embodiments from about 0.5 to about 500 micrometers, in some embodiments from about 1 to about 200 micrometers, and in some embodiments, from about 1 to about 60 micrometers. Likewise, thick films (or sheets) may have a thickness of from about 0.5 millimeters to about 25 millimeters, in some embodiments from about 0.6 to about 20 millimeters, and in some embodiments from about 1 to about 10 millimeters.

Due to its unique properties, the film may be used as a stand-alone product or incorporated into other types of products. For example, the film can be used in a stand-alone form as a shrink film, cling film, stretch film, sealing film, etc., or to form a package. Of course, the film can also be laminated to one or more substrates to form a composite. The substrate(s) may include a film, fibrous layer (e.g., nonwoven web, paper web, woven fabric, knit fabric, etc.), foam layer, metal layer (e.g., foils), and so forth. In one embodiment, for instance, the substrate(s) include a film. Suitable polymers for forming the film may include, for instance, a polyester, such as polyethylene terephthalate ("PET") or polybutylene terephthalate ("PBT"); polycarbonates; allyldiglycolcarbonates; polyacrylates, such as polymethylmethacrylate; polystyrenes; polysulfones; polyethersulfone; polyamides; polyvinyl chlorides ("PVC"); cellulose acetate butyrate; combinations thereof; and so forth. In one particular embodiment, the substrate is formed from polyethylene terephthalate. If desired, the substrate may be subjected to a surface treatment on a side facing the film so that the adhesiveness between the film and substrate is even further improved. Examples of such surface treatments include, for instance, corona discharge treatment, UV irradiation treatment, plasma treatment, metallization, etc. For example, corona treatment is a process in which an electrical discharge is applied between two narrowly spaced electrodes obtained under atmospheric pressure from a high voltage current. The electrical field generated by the electrodes excites the gas molecules (air) and dissociates some of those molecules to generate a glow of highly energetic species of ions, radicals, metastables and photons. When a substrate, such as a polyester film, is passed between the two electrodes and is exposed to the glow of active species, changes occur to the surface of the substrate that improve its adhesive properties.

The resulting composite may have a two-layer structure containing the film of the present invention and the substrate. For example, as noted above, the substrate may be a film (e.g., polyester film) or a fibrous layer (e.g., nonwoven web, paper web, or woven fabric). Alternatively, a multi-layered composite may be formed, such as a three-layer structure in which substrates are placed on both sides of the film, a five-layer structure in which films and substrates are alternately stacked, and so forth. The substrates may be the same or different. In one embodiment, for instance, one of the substrates may be a film and another of the substrates may be a fibrous layer, such as a paper web. Typically, it is desired that the film of the present invention is positioned between the substrates. In a three-layered structured, for instance, the film of the present invention may be positioned between a film substrate (e.g., polyester film) and a fibrous layer (e.g., paper web). Regardless of the number of layers employed, the peel strength between the film of the present invention and a substrate (e.g., polyester film) may be about 30 g$_f$/in or more, in some embodiments about 50 g$_f$/in or more, in some embodiments about 75 g$_f$/in or more, in some embodiments from about 80 to about 800 g$_f$/in, and in some embodiments, from about 100 to about 600 g$_f$/in, as determined using a 90° T-peel test in accordance with ASTM D1876-08 (2015).

Figure 1:
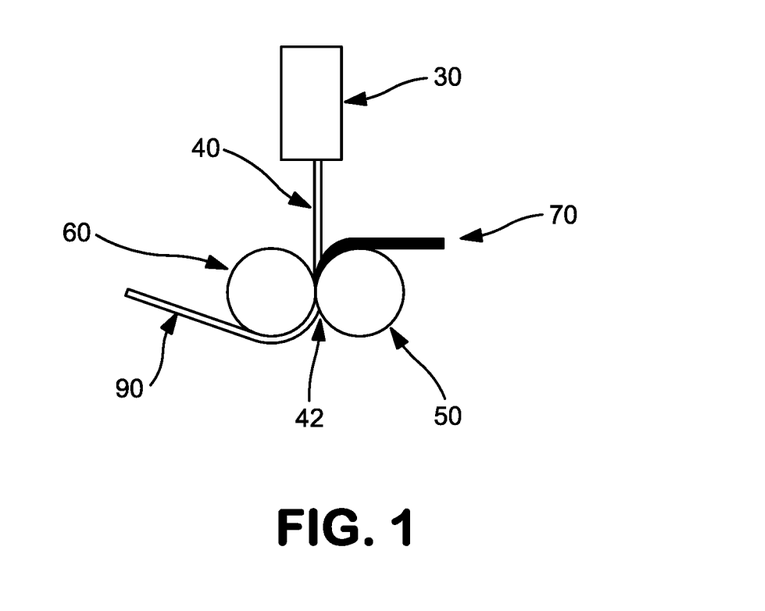
FIG. 1 is a schematic illustration of one embodiment of a method that may be employed to form the composite of the present invention.

When employed, any of a variety of techniques may be employed to form a composite. In one embodiment, for example, the composite may be formed by extrusion coating the film onto the substrate. One example of such an extrusion coating process in shown in FIG. 1. As illustrated, the polymer composition (e.g., in the form of pellets) may be initially supplied through an extruder (not shown) where the polymer composition is subjected to head and pressure. The molten polymer composition is then forced by a screw (not shown) through a slit of an extrusion coating die 30. The slit may be straight line-shaped so that a molten film 40 is formed that is in the form of a thin sheet. The molten film 40 is thereafter drawn down into a nip 42 formed between a first roll 50 and a second roll 60. While the nature of these rolls may vary, in one embodiment, the first roll 50 may be a rubber-covered pressure roll and the second roll 60 may be a chill roll. Concurrently, a substrate 70 is also supplied to the nip 42. Thus, at the nip 42, the molten film 40 is drawn down to the prescribed thickness or gauge and forced onto the substrate 70 as both layers are traverse between the two rolls to form a composite 90. The pressure at the nip may vary, but is typically from about 30 to about 120 pounds per linear inch. The resulting composite 90 may be subjected to any desired additional processing as is known in the art, such as slitting, cutting, stretching, heat treating, printing, etc. Furthermore, additional layers may be laminated to the composite 90 using techniques known in the art. Typically, such additional layers are located adjacent to the film 40 to ensure good adhesion.

Figure 3:
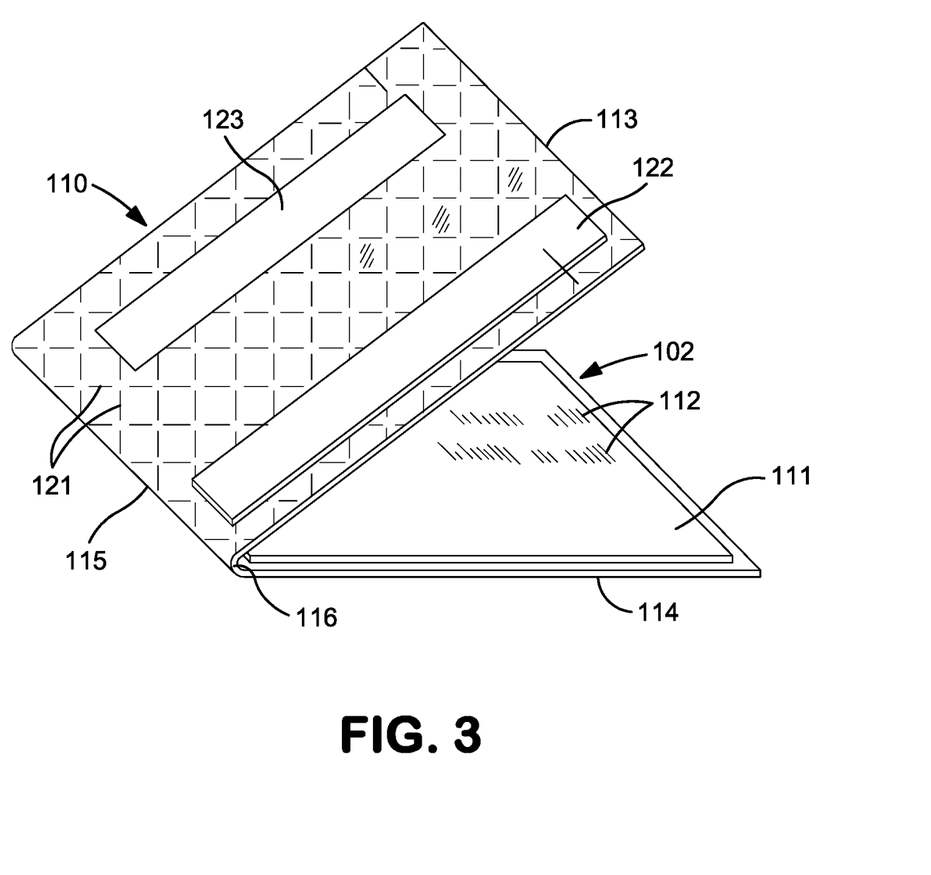
FIG. 3 is a schematic illustration of one embodiment of a pouch that can employ the film or composite of the present invention.

The melt-extruded films and composites of the present invention may be employed in a wide variety of applications. For example, the film and/or composite may be used for packaging items, such as food products (e.g., snack packaging, heavy duty bags, grocery sacks, baked and frozen food packaging, frozen food, beverages, etc.), medical products, biological materials, electronic devices, garbage, and so forth. In other embodiments, the film and/or composite may be employed to protect items, such as documents, identification cards (e.g., driver's license), credit card, certificates, photographs, menus, etc. In such embodiments, it may be desired that the film and/or composite is in the form of a pouch or sleeve that defines an interior cavity which the item may be inserted. Referring to FIG. 3, for example, one example of a pouch 110 is shown that can be formed from the film or composite of the present invention. As shown, the pouch 110 may contain a cavity 102 configured to contain a document 111 having indicial 112. For example, the pouch 110 may contain a first pouch element 113 and a second pouch element 114 joined to each other along a fold line 115. If desired, the pouch elements 113 and 114 may be formed from the film or composite of the present invention, which may be scored as indicated at 116 to provide for accurate folding along the line 115. If desired, the pouch 110 may also contain an embossed security pattern 121 or security strips 122 and 123. Of course, in addition to the products noted above, it should be understood that the film and composite can be used for other applications as well, such as in labels, containers (e.g., lidding), paperboard coating, clothing (e.g., hospital gowns), tarps, etc.

The present invention may be better understood with reference to the following examples.

TEST METHODS

Melt Flow Index:

The melt flow index may be determined in accordance with ASTM D1238-13 at a load of 2.16 kilograms and a temperature of 190° C.

Melting and Glass Transition Temperature:

The melting temperature ("Tm") and glass transition temperature ("Tg") may be determined by differential scanning calorimetry ("DSC") in accordance with ASTM D3418-12e1. Under the DSC procedure, samples may be heated and cooled at 20° C. per minute as stated in ISO Standard 10350 using DSC measurements conducted on a TA Q2000 Instrument.

Oxidative Properties:

The oxidative properties of a polymer sample can be determined using differential scanning calorimetry ("DSC") in accordance with ASTM D3895-14. More particularly, a sample may be initially equilibrated under a nitrogen blanket for 2 minutes at 180° C. After equilibration, the atmosphere over the sample may be switched to oxygen. The oxidation process, which is exothermic, may be monitored at 180° C. by measuring the heat flow from the sample. The onset time for oxidation may be determined as the onset of heat flow, and the oxidation process may be followed for an additional 240 minutes. The heat flow measurements may be made as stated in ISO Standard 10350-1:2007 and conducted on a TA Q2000 Instrument.

Peel Strength:

The peel strength between a test sample and substrate (e.g., polyester film) may be measured using a 90° T-peel test in accordance with ASTM D1876-08(2015). More particularly, specimens are cut from a T-peel panel to a size of 1 inch×12 inches. The specimen is clamped in the jaws of a tensile tester (e.g., SINTECH™ Tester from MTS Systems). During the test, the force initially increases before reaching a stable level after a peel displacement of two (2) inches. The full test may be completed after six (6) inches of displacement. For each test sample, each sampled force data point collected between displacements of three (3) inches and six (6) inches on five (5) test specimens may be used for analysis. T-Peel strength may be calculated as the average load (grams-force, $g_f$) per inch, as measured during the 90° T-Peel test for (5) samples.

Control A

ATEVA® 1609 (vinyl acetate=16%, melt index=8.4 dg/min) pellets are compounded in a Haake mixer equipped with at 310 $cm^3$ mixing bowl. The bowl temperature is set at 140° C. and the rotors are turned at a rate of 20 RPM. Once added to the mixer, the pellets are allowed to flux until completely melted. After the melting is complete, the mixer is run for 1 minute before the rotors are turned off and the material is collected.

EXAMPLE 1

A composition is formed as described above, except that it contains 0.1% wt. % (1000 ppm) of iron(III) stearate. More particularly, iron(III) stearate powder is dry blended with ATEVA® 1609 pellets. The pellets are then compounded as described above.

Figure 2:
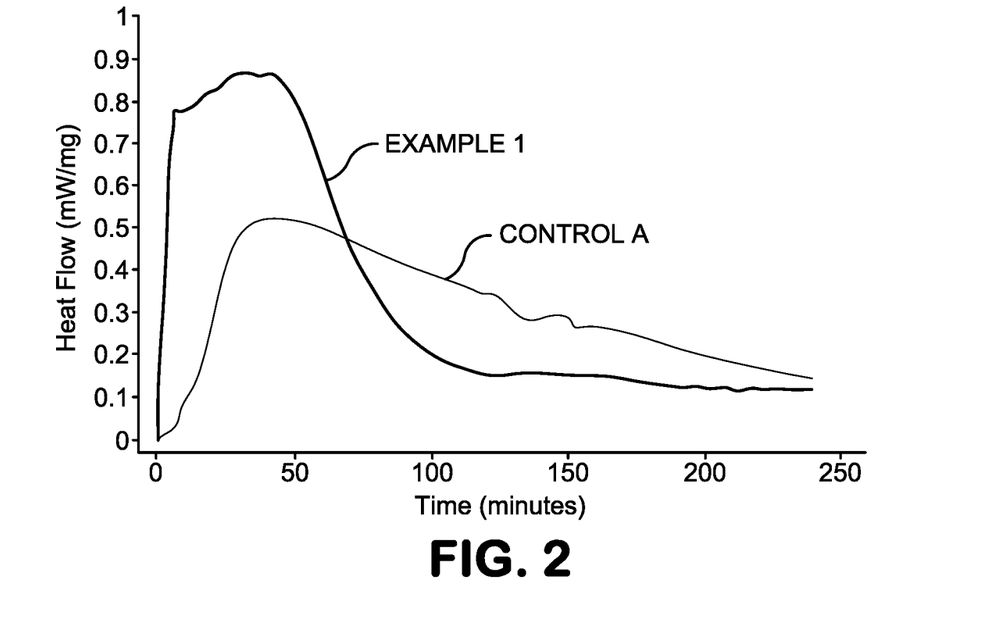
FIG. 2 shows the heat flow versus time during the oxidation test for Control A and Example 1.

Once formed, the samples of Control A and Example 1 are tested for the degree of oxidation using the test method described above. After introducing oxygen, the onset of oxidation was 6.6 minutes for Control A and 0.5 minutes for Example 1. FIG. 2 also shows the heat flow during the oxidation test, which is a measure of the progress of oxidation. As indicated, the rate of heat flow gradually increases for Control A, reaching a maximum heat flow at around 40 minutes of oxidation time. Example 1 initially oxidizes more quickly than Control A as indicated by the rapid initial rise in measured heat flow. This rapid rise occurs within the first 7 minutes of the test and is followed by an approximately 30 minutes where the rate of oxidation nearly plateaus. Without intending to be limited by theory, it is believed that this increase in the oxidation rate is expected to improve adhesion between the polymer composition and various substrates.

Control B

ATEVA® 1609 (vinyl acetate=16%, melt index=8.4 g/10 min) is cast between the nip of a chilled metal roll and a rubber roll to form a film having a nominal thickness of 25 micrometers. Simultaneously, a 40 cm×30 cm sheet of a polyester film is also fed into the nip. Samples are made with both untreated and corona-treated polyester films are tested.

The melt temperature of the polymer is maintained at a nominal value of 240° C. for the duration of the study.

EXAMPLE 2

Iron(III) stearate powder is dispersed on the surface of ATEVA® 1609 pellets by tumble blending the materials in a drum. The pellet/powder composition is then compounded via a twin screw extruder to form a masterbatch containing 1 wt. % iron(III) stearate. The masterbatch is then tumble blended with ATEVA® 1609 so that the final concentration of iron stearate is 50 parts per million. The blend is cast onto a polyester film (untreated and corona-treated) as described above.

Control C

ATEVA® 1813 (vinyl acetate=18%, melt index=1.6 g/10 min) is cast onto a polyester film (untreated and corona-treated) as described above.

EXAMPLE 3

ATEVA® 1813 is tumble blended with 0.25 wt. % of an OxoTerra-EVM™ masterbatch. The OxoTerra-EVM™ (Willow Ridge Plastics) masterbatch contains a mixture of transition metal stearates (manganese stearate and iron stearate) at a nominal level of 8 wt. %. The blend is then cast onto a polyester film (untreated and corona-treated) as described above.

EXAMPLE 4

ATEVA® 1813 is tumble blended with 0.5 wt. % of an OxoTerra-EVM™ masterbatch and then cast onto a polyester film (untreated and corona-treated) as described above.

Figure 4:
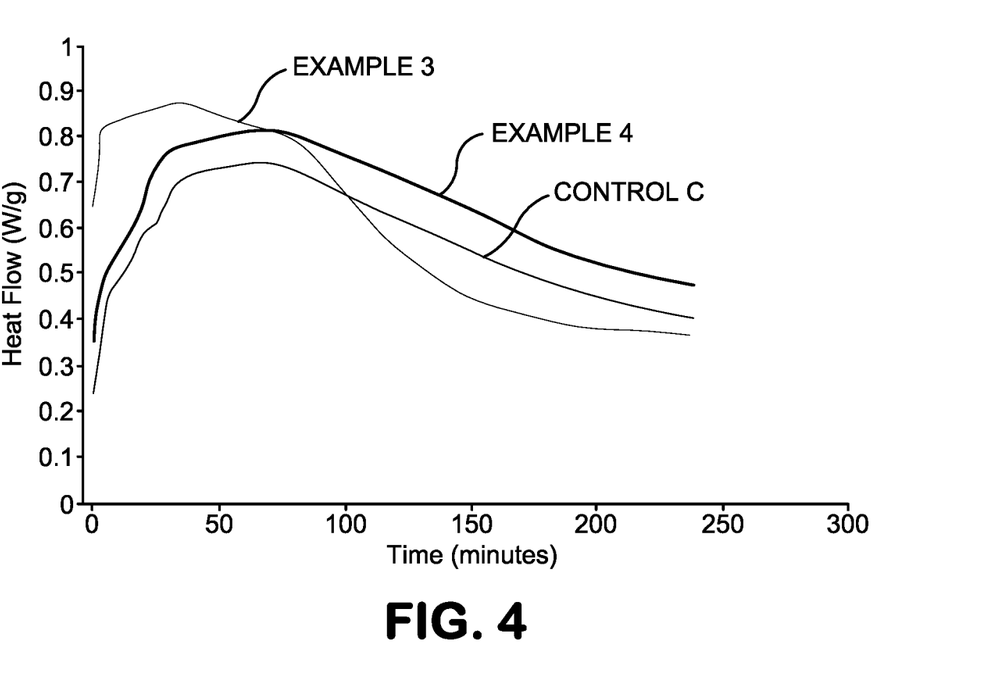
FIG. 4 shows the heat flow versus time during the oxidation test for Control C, Example 3, and Example 4.

Once formed, the samples of Control C, Example 3, and Example 4 are tested for the degree of oxidation using the test method described above. FIG. 4 shows the heat flow during the oxidation test. As indicated, Examples 3 and 4, which contain a transition metal salt, exhibit a higher oxidation rate than the control sample. The peel strength of Control B, Example 3, Control C, Example 4, and Example 5 is tested for both untreated and corona-treated polyester samples. The results are set forth in the table below.

|  | Control B | Example 3 | Control C | Example 4 | Example 5 |
| --- | --- | --- | --- | --- | --- |
| Untreated Polyester Average Peel Strength (g$_f$/in) | 15 | 18 | 6 | 24 | 26 |
| Corona treated Polyester Average Peel Strength (g$_f$/in) | 52 | 78 | 17 | 360 | 350 |

As indicated, a dramatic improvement resulted for the sample containing a transition metal salt.

EXAMPLE 5

Figure 5:
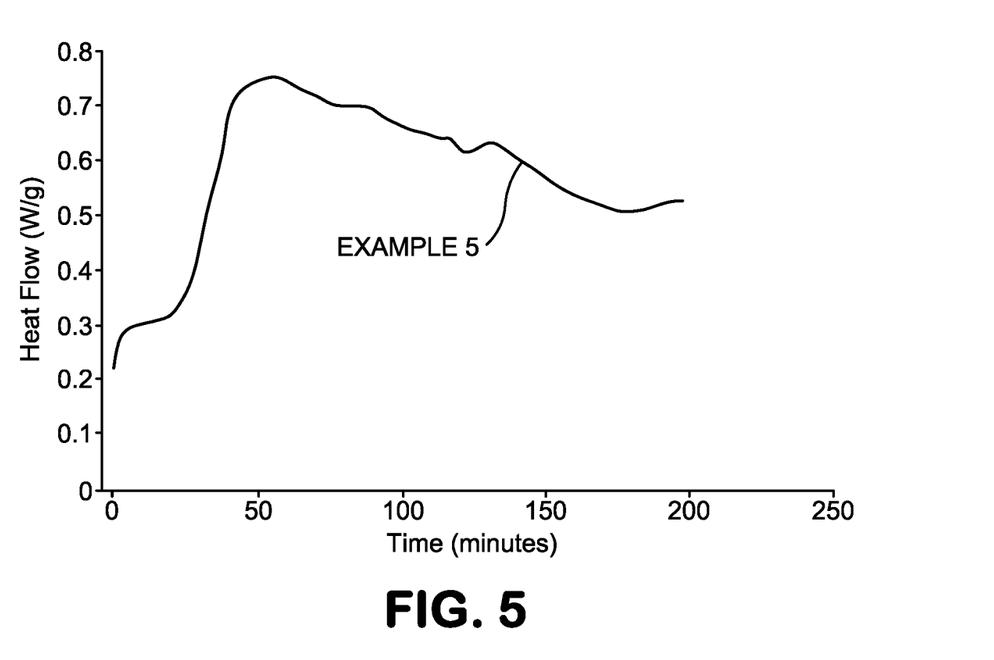
FIG. 5 shows the heat flow versus time during the oxidation test for Example 5.

ATEVA® 2821A (vinyl acetate=28%, melt index=25 g/10 min) pellets are dry blended with 50 ppm) of iron(III) stearate. Once formed, the sample is tested for the degree of oxidation using the test method described above. FIG. 5 shows the heat flow during the oxidation test.

Control D

LDPE 418 (Celanese EVA Polymers), a low density polyethylene with a melt index of 12.7 g/10 min and a density of 0.917 g/cm$^3$, is cast onto a polyester film (untreated and corona-treated) as described above.

EXAMPLE 6

LDPE 418 is tumble blended with 0.25 wt. % of a PDQ-H masterbatch (Willow Ridge Plastics), which contains a transition metal stearate at a nominal level of 8 wt. % in linear low density polyethylene. The blend is then cast onto a polyester film (untreated and corona-treated) as described above.

Figure 6:
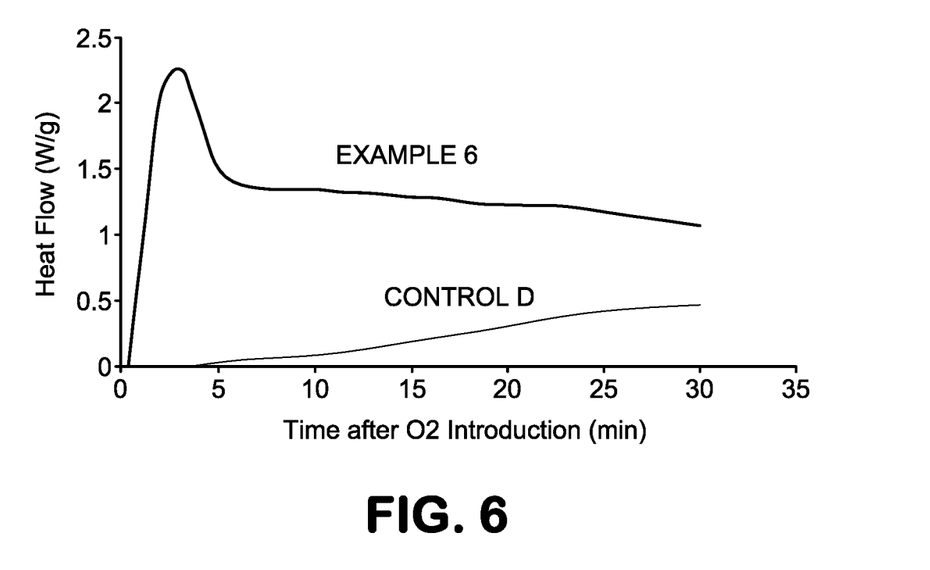
FIG. 6 shows the heat flow versus time during the oxidation test for Control D and Example 6.

Once formed, the samples of Control D and Example 6 are tested for the degree of oxidation using the test method described above. FIG. 6 shows the heat flow during the oxidation test. Control D, which contains a transition metal salt, exhibits a gradual rise in heat flow consistent with slow oxidation, and never reaches a peak value during the 30 minute test. The measured heat flow of Control D does not exceed 0.5 W/g during the test. Example 6 exhibits rapid oxidation, with a peak heat flow of 2.3 W/g.

The peel strength of Control D and Example 6 is tested for both untreated and corona-treated polyester samples. The results are set forth in the table below.

|  | Control D | Example 6 |
| --- | --- | --- |
| Untreated Polyester Average Peel Strength (g$_f$/in) | 11 | 20 |
| Corona treated Polyester Average Peel Strength (g$_f$/in) | 15 | 130 |

As indicated, a dramatic improvement resulted for the sample containing a transition metal salt.

EXAMPLE 7

ATEVA® 1615 pellets (vinyl acetate=16%, melt index=15.4 g/10 min) are compounded in a single screw extruder with 0.25 wt. % of BDA masterbatch (Willow Ridge Plastics), which contains a transition metal stearate at a nominal level of 2 wt. % in ethylene vinyl acetate. After compounding, the melt index of the material was 11.0 g/10 minutes. The blend is then cast onto a corona-treated polyester film as described above. The peel strength of the corona-treated polyester sample was 240 g$_f$/in.

EXAMPLE 8

ATEVA® 1615 pellets are compounded in a single screw extruder with 0.25 wt. % of BDA masterbatch (Willow Ridge Plastics) and a second masterbatch containing Irganox® 1076. The second masterbatch was added at a level so that the final amount of Irganox® 1076 in the blend is 120 ppm. After compounding, the melt index of the material was 13.0 g/10 minutes, which is closer to the original melt index of 15.4 g/10 min than what was observed in Example 7. The blend was then cast onto a corona-treated polyester film as described above. The peel strength of the corona-treated polyester sample was 250 g$_f$/in.

EXAMPLE 9

Samples are formed as described in Example 8, except that the final amount of Irganox® 1076 in the blend is 250 ppm. After compounding, the melt index of the material was 15.5 g/10 minutes and the peel strength of the corona-treated polyester sample was 320 g/in.

Control E

An EVA copolymer (28% VA, MI=25 g/10 min) is cast onto a corona-treated polyester film as described above. The peel strength was 220 g/in.

EXAMPLE 10

An EVA copolymer (28% VA, MI=25 g/10 min) containing 450 ppm of Irganox 1076™ is compounded with 0.25 wt. % of a BDA masterbatch. The blend is then cast onto a corona-treated polyester film as described above. The resulting peel strength was 70 g/in.

EXAMPLE 11

An EVA copolymer (28% VA, MI=25 g/10 min) is compounded with a masterbatch containing Irganox™ 1076 and with 0.25 wt. % of a BDA masterbatch, such that the final concentration of Irganox 1076™ in the blend is 290 ppm. The blend is then cast onto a corona-treated polyester film as described above. The resulting peel strength was 530 g/in.

Figure 7:
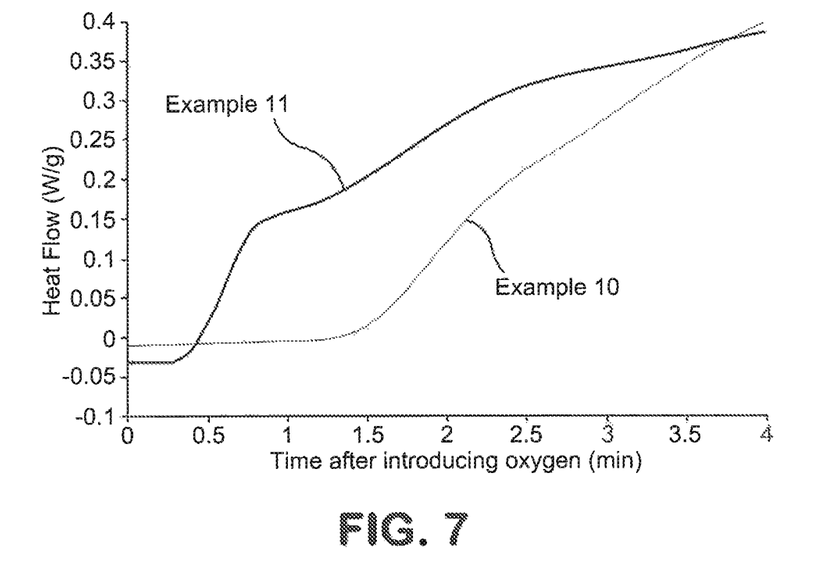
FIG. 7 shows the heat flow versus time during the oxidation test for Examples 10 and 11 (scale of 0 to 4 minutes)
Figure 8:
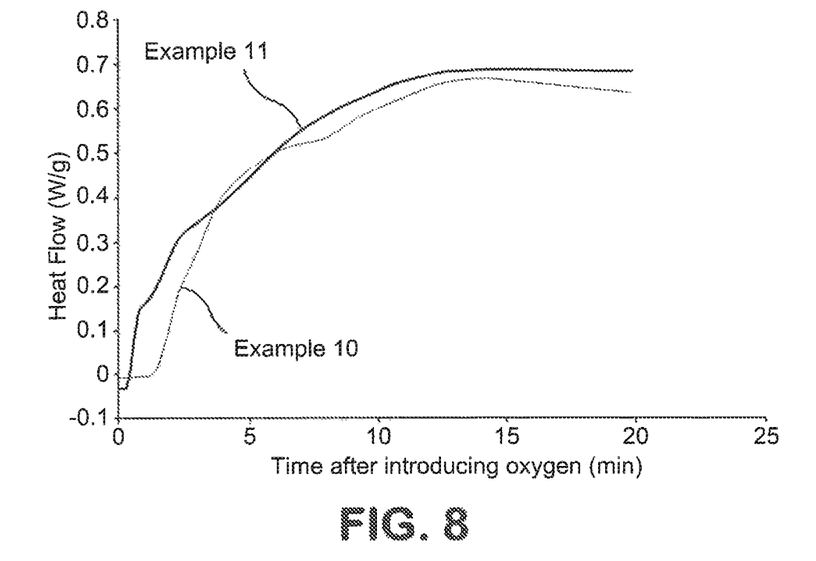
FIG. 8 shows the heat flow versus time during the oxidation test for Examples 10 and 11 (scale of 0 to 25 minutes).

Once formed, the samples of Examples 10 and 11 are tested for the degree of oxidation using the test method described above. FIGS. 7-8 shows the heat flow during the oxidation test. In Example 10, the initial onset of heat flow occurred in 80 seconds and the sample reached a heat flow of 0.15 W/g in about 2 minutes. In Example 11, the initial onset of heat flow occurred in less than 20 seconds and the sample reached a heat flow of 0.15 W/g in about 40 seconds.

Control F

ATEVA® 1615 pellets are extrusion coated onto a corona-treated polyester film to form a document protection laminating film. This film is then thermally laminated to a sheet of paper using a Fellowes Titan 125 office laminator, with the ethylene vinyl acetate forming the thermal adhesive bonding the paper to the polyester film. The peel strength of the resulting paper/film laminate, which was tested by separating the lamination film from the paper, was 60 g/in.

EXAMPLE 12

ATEVA® 1615 pellets are compounded with 0.25% Oxo-terra-EVM (Willow Ridge Plastics) and then extrusion coated onto a corona-treated polyester film to form a document protection laminating film. This film is then thermally laminated to a sheet of paper using a Fellowes Titan 125 office laminator, with the ethylene vinyl acetate forming the thermal adhesive bonding the paper to the polyester film. The peel strength of the resulting paper/film laminate, which was tested by separating the lamination film from the paper, was 100 g/in.

Control G

ATEVA® 1615 pellets are extrusion coated onto a corona-treated polyester film to form a document protection laminating film. This film is then thermally laminated to a sheet of paper using a Fellowes Titan 125 office laminator, with the ethylene vinyl acetate forming the thermal adhesive bonding the paper to the polyester film. The peel strength of the resulting paper/film laminate, which was tested by separating the lamination film from the paper, was 45 g/in.

EXAMPLE 13

ATEVA® 1615 pellets are compounded with 0.25% Oxo-terra-EVM (Willow Ridge Plastics) and then extrusion coated onto a corona-treated polyester film to form a document protection laminating film. This film is then thermally laminated to a sheet of paper using a Fellowes Titan 125 office laminator, with the ethylene vinyl acetate forming the thermal adhesive bonding the paper to the polyester film. The peel strength of the resulting paper/film laminate, which was tested by separating the lamination film from the paper, was 110 g/in.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising at least one ethylene vinyl acetate polymer in an amount of at least about 50 wt. % of the polymer composition and at least one transition metal salt in an amount of from about 10 to about 1,000 parts per million based on the weight of ethylene vinyl acetate polymers in the composition, wherein the polymer composition exhibits a heat flow of about 0.7 watts per gram or more after being exposed to an oxygen atmosphere at a temperature of 180° C. for a time period of about 100 minutes or less, wherein the ethylene vinyl acetate polymer has a vinyl acetate content of from about 5 wt. % to about 35 wt. % and a density of from about 0.900 to about 1.00 gram per cubic centimeter as determined in accordance with ASTM D1505-10.

2. The polymer composition of claim 1, wherein the ethylene vinyl acetate polymer has a vinyl acetate content of from about 12 wt. % to about 25 wt. %.

3. The polymer composition of claim 1, wherein the ethylene vinyl acetate polymer has a density of from about 0.930 to about 0.960 gram per cubic centimeter as determined in accordance with ASTM D1505-10.

4. The polymer composition of claim 1, wherein the transition metal salt contains a multi-valent transition metal cation.

5. The polymer composition of claim 4, wherein the cation is iron, manganese, nickel, copper, cobalt, vanadium, chromium, or a combination thereof.

6. The polymer composition of claim 1, wherein the transition metal salt contains a carboxylate anion.

7. The polymer composition of claim 6, wherein the carboxylate anion is derived from a fatty acid.

8. The polymer composition of claim 7, wherein the fatty acid is lauric acid, myristic acid, behenic acid, oleic acid, palmitic acid, stearic acid, ricinoleic acid, capric acid, neo-decanoic acid, hydrogenated tallow fatty acid, hydroxy stearic acid, the fatty acids of hydrogenated castor oil, erucic acid, coconut oil fatty acid, or a combination thereof.

9. The polymer composition of claim 8, wherein the salt is nickel stearate.

10. The polymer composition of claim 8, wherein the salt is cobalt stearate.

11. The polymer composition of claim 8, wherein the salt is iron stearate, manganese stearate, or a combination thereof.

12. The polymer composition of claim 1, wherein the composition contains a mixture of transition metal salts.

13. The polymer composition of claim 12, wherein the mixture contains an iron salt and a manganese salt.

14. The polymer composition of claim 1, wherein the composition further contains an antioxidant.

15. The polymer composition of claim 14, wherein the antioxidant is a sterically hindered phenol.

16. The polymer composition of claim 14, wherein the antioxidant is present in an amount of from about 50 to about 450 parts per million of the composition.

17. The polymer composition of claim 1, wherein after being exposed to an oxygen atmosphere at a temperature of 180° C., the composition exhibits an onset of heat flow in about 1 minute or less.

18. The polymer composition of claim 1, wherein the composition has a melt flow index of from about 5 to about 30 g/10 min as determined in accordance with ASTM D1238-13 at a temperature of 190° C. and a load of 2.16 kilograms.

19. The polymer composition of claim 1, wherein the melt flow index of the ethylene vinyl acetate polymer is from about 0.1 to about 70 g/10 min, as determined in accordance with ASTM D1238-13 at a temperature of 190° C. and a load of 2.16 kilograms.

20. The polymer composition of claim 1, wherein the melt flow index of the ethylene vinyl acetate polymer is from about 1 to about 35 g/10 min, as determined in accordance with ASTM D1238-13 at a temperature of 190° C. and a load of 2.16 kilograms.

* * * * *